United States Patent [19]
Tucker

[11] 3,952,681
[45] Apr. 27, 1976

[54] AUTOMATIC STEERING SYSTEM FOR VESSELS WITH A WIRELESS REMOTE CONTROL AND COURSE CHANGE CAPABILITY

[75] Inventor: Kenneth Tucker, Miami Lakes, Fla.

[73] Assignee: Tucker Systems, Inc., Miami Lakes, Fla.

[22] Filed: May 27, 1975

[21] Appl. No.: 580,934

Related U.S. Application Data

[63] Continuation-in-part of Ser. No. 456,447, April 1, 1974, abandoned.

[52] U.S. Cl. ............................ 114/144 A; 318/588; 318/591; 318/640; 318/647
[51] Int. Cl.² ......................................... B63H 25/02
[58] Field of Search ..................... 33/356, 358, 360; 73/178 R; 114/144 E, 144 A, 126; 180;2;79.1;98/; 235/150.2, 150.26; 244/50, 77 A, 77 B, 77 E, 77 V, 77 SE; 318/588, 591, 618, 640, 647; 343/107

[56] References Cited
UNITED STATES PATENTS

| | | | |
|---|---|---|---|
| 3,169,501 | 2/1965 | Wesner .............................. | 114/126 |
| 3,593,093 | 7/1971 | Bettcher .................. | 114/144 E UX |
| 3,662,243 | 5/1972 | Cavil et al. ...................... | 114/144 E |
| 3,670,227 | 6/1972 | Kundler et al. ............. | 114/144 A X |
| 3,673,977 | 7/1972 | Hendley .......................... | 114/144 E |
| 3,696,282 | 10/1972 | Hirokawa et al. ........... | 114/144 E X |
| 3,737,635 | 6/1973 | Hastings .......................... | 114/144 E |
| 3,757,723 | 9/1973 | Pangalila ............................ | 114/126 |

*Primary Examiner*—Trygve M. Blix
*Assistant Examiner*—Stephen G. Kunin
*Attorney, Agent, or Firm*—Wolfe, Hubbard, Leydig, Voit & Osann, Ltd.

[57] ABSTRACT

An automatic steering system for vessels, operational in a manual mode to select a desired heading, and in an automatic mode to maintain the selected heading. In the manual mode, a magnetic compass incorporated in a servo loop is maintained at a null position to continually monitor the vessel heading. When the system is switched to the automatic mode, the compass servo loop is deactivated and a control loop activated. The control loop keeps the compass output at null by maintaining the vessel on the selected heading. Automatic course corrections are accomplished by turning the helm an amount proportional to a deviation signal, and immediately returning the helm to its original position less a small preset angle. A wireless remote control unit affords the capability of remotely steering the vessel, selecting a new course, and switching between automatic and manual modes.

29 Claims, 7 Drawing Figures fig. 1.

AUTOMATIC STEERING SYSTEM FOR VESSELS WITH A WIRELESS REMOTE CONTROL AND COURSE CHANGE CAPABILITY

This is a continuation in-part of applicaton Ser. No. 456,447, filed Apr. 1, 1974, now abandoned.

This invention relates to automatic steering systems for marine vessels, and more particularly to those utilizing a magnetic compass to maintain the vessel on a selected heading.

Although the automatic pilot concept is an attractive one, utilization of prior art pilots has been limited due to their complexity and resultant expense. In addition, as many of such pilots require feedback elements on the rudder, limit switches for protecting against overtravel, and other such peripheral components, installation is a further complicating factor.

Many of the automatic pilot systems known heretofore are characterized by excessive hunting in maintaining a preselected heading. This not only results in following a course which is somewhat serpentine, but in addition causes excessive wear on the components in the steering system and excessive power consumption.

A further shortcoming of many of the prior art automatic pilots is the inability of an operator to override the pilot, such as during a panic situation. For example, before making an emergency course change to avoid a collision, the operator must remember to switch the pilot back to manual control before he may affect the helm.

With the foregoing in mind, it is a general objective of the present invention to provide an automatic steering system for vessels or the like having an operating mode which is different than pilots known heretofore, in which the system operates to maintain a preselected heading with minimal hunting. More specifically, it is an object of the invention to provide such a system wherein drift is minimized, and having the capability to automatically trim the rudder to compensate for varying operational conditions.

It is a more detailed object to provide an automatic steering system which operates in a first mode to continually monitor the heading of a vessel, and which when switched into a second mode, remembers the previous heading and maintains the vessel on that heading. Thus, it is an object to provide a system with an automatic course memory.

A further objective of the invention is to provide an automatic pilot which may be used with numerous vessel steering systems, and in which the complexity of installation in such systems is minimized.

Yet another object of the invention is the provision of an automatic pilot which may be manually overridden by an operator, such as in an emergency.

It is a further object to provide an automatic steering system having a wireless control which allows steering of the vessel and control of the pilot from a location remote from the helm.

Other objects and advantages will become apparent from the following detailed description when taken in conjunction with the drawings in which:

FIGS. 5a and 5b are a logic diagram similar to FIGS. 3a and 3b.

While the invention will be described in connection with certain preferred embodiments, it will be understood that there is no intent to limit it to those embodiments. On the contrary, the intent is to cover all alternatives, modifications and equivalents as may be included within the spirit and scope of the invention as defined by the appended claims.

In practicing the invention, an automatic steering system is provided which operates in a manual mode to continually monitor the heading of a vessel, and which may be switched to an automatic mode to maintain the vessel on that heading. A magnetic compass, which forms the system sensing element, has a compass card which aligns itself with the earth's magnetic poles, and a compass case whose angular position is controlled by a servo motor. The compass is arranged to provide a DC potential dependent upon the relative alignment between the compass card and compass case.

To continually monitor the vessel heading in the manual mode, a servo loop senses the signal produced by the compass and, acting through the servo motor, rotates the compass case to maintain that signal at a predetermined level. Thus, the angular position of the compass case is controlled to null the compass output signal.

To cause the steering system to maintain a heading, the system is switched to the automatic mode, deactivating the compass servo loop and causing the compass case to be angularly fixed with respect to the vessel. A course deviation will then cause the compass case-vessel combination to rotate with respect to the compass card, producing a deviation signal. This signal is sensed by the control circuit and causes a helm adjustment to steer the vessel back toward its preselected heading. In contrast to prior art systems which attempt to null an error signal to cause the vessel to resume its selected course, my automatic pilot system causes a corrective helm change which is proportional to the error signal and immediately returns the helm to its original position less a small preset angle. At the termination of this cycle, the heading is again sensed and a further correction made if necessary. Should the vessel continue to drift off-course in the same direction, the cycle is repeated, each time leaving the rudder in a new neutral position resulting from the summation of the small preset angles. This allows the neutral position to change as needed to compensate for factors such as ocean currents, winds, or variations in handling of the vessel at various speeds. As will respect more apparent, a Yaw control is provided to relate the amount of correction to the level of error signal thereby "tailoring" the automatic steering system to the characteristics of the vessel.

In summary, in the manual mode, a servo loop causes the compass case to maintain a known relationship with respect to a magnetic compass card, while in the automatic mode, the compass case is fixed with respect to the vessel, and a control loop is provided which causes the vessel-compass case combination to maintain that same relationship with respect to the compass card. At all times, the compass card maintains its known relationship with respect to the earth's magnetic poles.

Figures 1, 2:
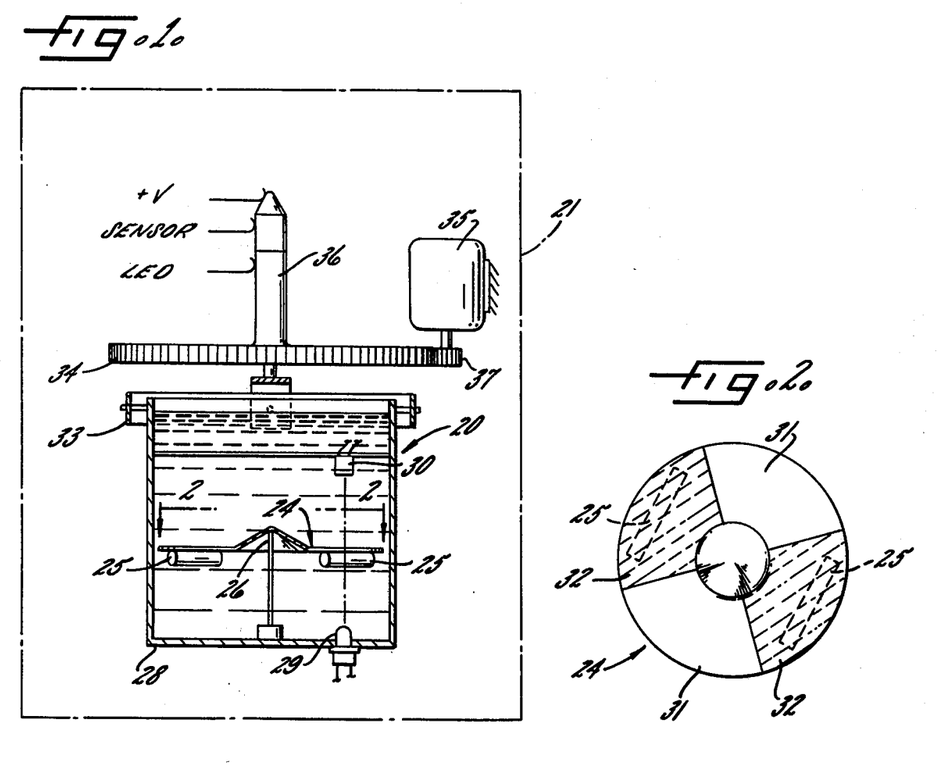
FIG. 1 is a diagram illustrating a gimbaled compass for use in the automatic steering system.
FIG. 2 is a top view of the compass card taken generally along the lines 2—2 of FIG. 1.

Turning now to the drawings, and particularly to FIGS. 1 and 2, there is diagrammatically illustrated one form of magnetic compass which may be used as the sensing element in my automatic steering system. The compass, generally indicated at 20, is mounted within a protective outer housing 21 so that the entire compass assembly may be safely mounted in any convenient location. A compass card 24 having a pair of magnets 25 is mounted in a conventional manner on compass bearing 26 for allowing the compass card to align itself with the earth's magnetic poles. The compass case 28, which supports the compass bearing 26, has affixed thereto a light source and a light sensitive element, shown herein as light emitting diode 29 and photoresistor 30 respectively. As best seen in FIG. 2, the compass card 24 may be formed of a plexi-glass ring having opposed translucent portions 31 and similarly opposed opaque portions 32. The compass card is interposed between the photodiode and photosensitive resistor so that the angular position of the compass card with respect to the case controls the amount of light transmitted from the photodiode to the photoresistor. The resistance of the photoresistor therefore varies from a maximum when an opaque portion 32 blocks the illumination from the photodiode, to a minimum when a translucent portion 31 passes maximum illumination. As will become more apparent, the automatic steering system is arranged to cause the compass case to assume a position wherein the compass card allows approximately one-half of the photoresistor to be illuminated, by rotating the case so that one of the divisions between the translucent and opaque portions of the compass card is disposed intermediate the light emitting diode and photoresistor.

The compass case may, in a known manner, be filled with a vibration dampening fluid and sealed. The compass case is privotably mounted at its upper portion to a gimbal ring 33 which in turn is pivotably mounted to a driving gear 34. The driving gear 34 is rotatably affixed to the outer housing 21 and arranged to be driven by a servo motor 35 having a drive gear 37. It will be appreciated from the foregoing that the gimbal assembly allows the compass to maintain a horizontal attitude independently of the attitude of the vessel in which it is mounted, while the drive gear 34 is adapted to rotate the entire gimbaled compass assembly about its axis. Thus, the motor 35 is adapted to control the angular position of the compass case and thereby the position of the light emitting diode and photoresistor, to maintain those elements in their proper relationship with the compass card. Transfer of electrical signals to and from the rotatable assembly is accomplished through slip ring and brush assembly 36.

Figure 3A:
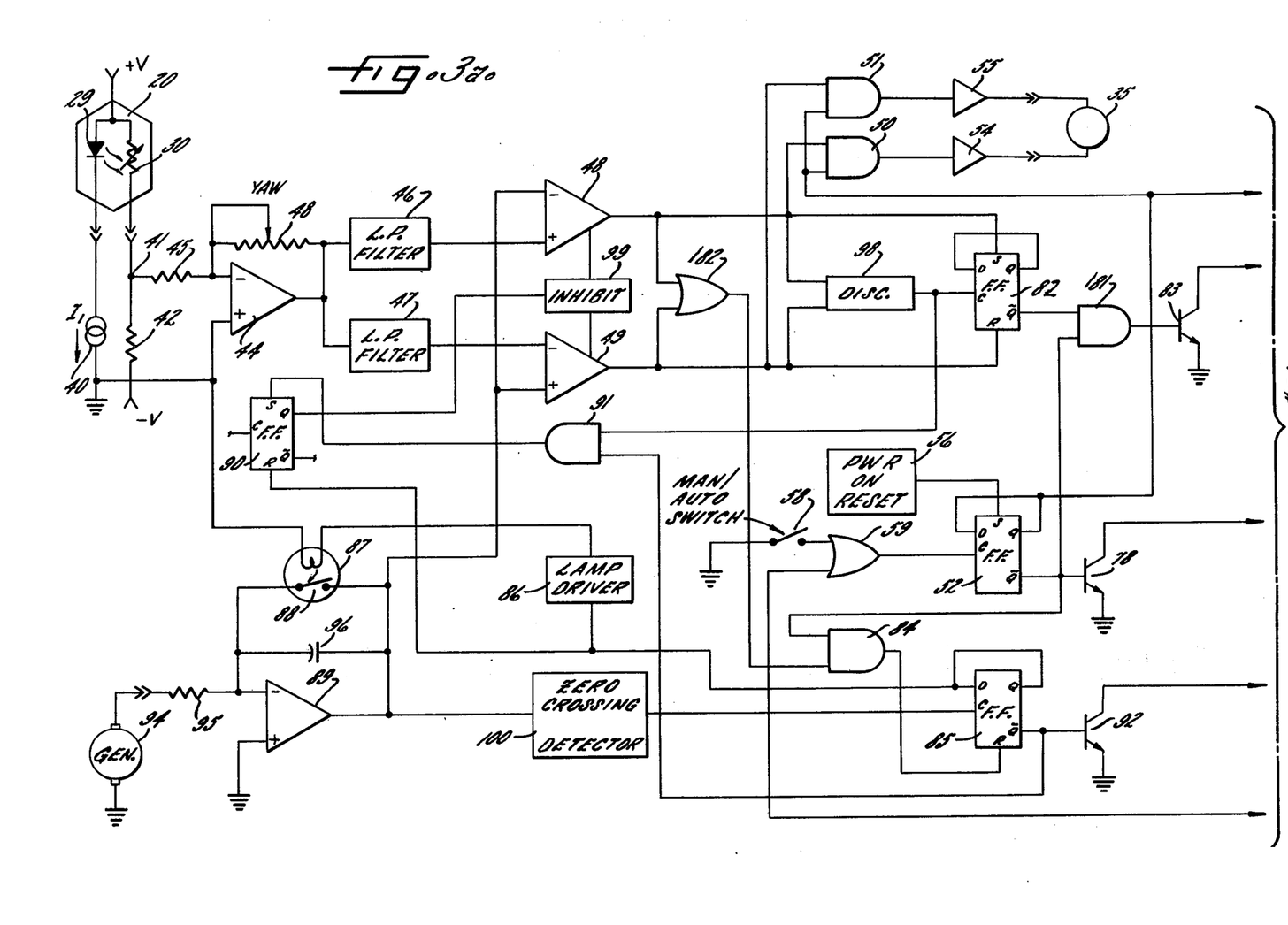
FIGS. 3a and 3b when joined as indicated form a logic diagram of a first embodiment of the automatic steering system.

Referring to FIG. 3a, the sensing portion of the compass assembly is indicated at 20 including light-emitting diode 29 and photoresistor 30. The compass unit is provided with a positive supply of voltage, and a constant current drain, illustrated as current generator 40, to maintain a constant level of illumination from the light emitting diode 29. The photoresistor 30 is illustrated as a variable resistor which is coupled to node 41 for supplying an input signal to the steering system. Resistor 42 is coupled between node 41 and a negative supply of voltage. The value of resistor 42 is selected such that node 41 is maintained at a predetermined voltage, such as zero volts, when the compass card is positioned to allow approximately one-half of the photoresistor to be illuminated. It is therefore seen that if a greater portion of the photoresistor is illuminated, the resistance 30 will decrease causing the voltage at node 41 to increase. Similarly, if a greater portion of the photoresistor 30 is shielded from the light source 29, the voltage at node 41 will decrease.

Figure 3B:
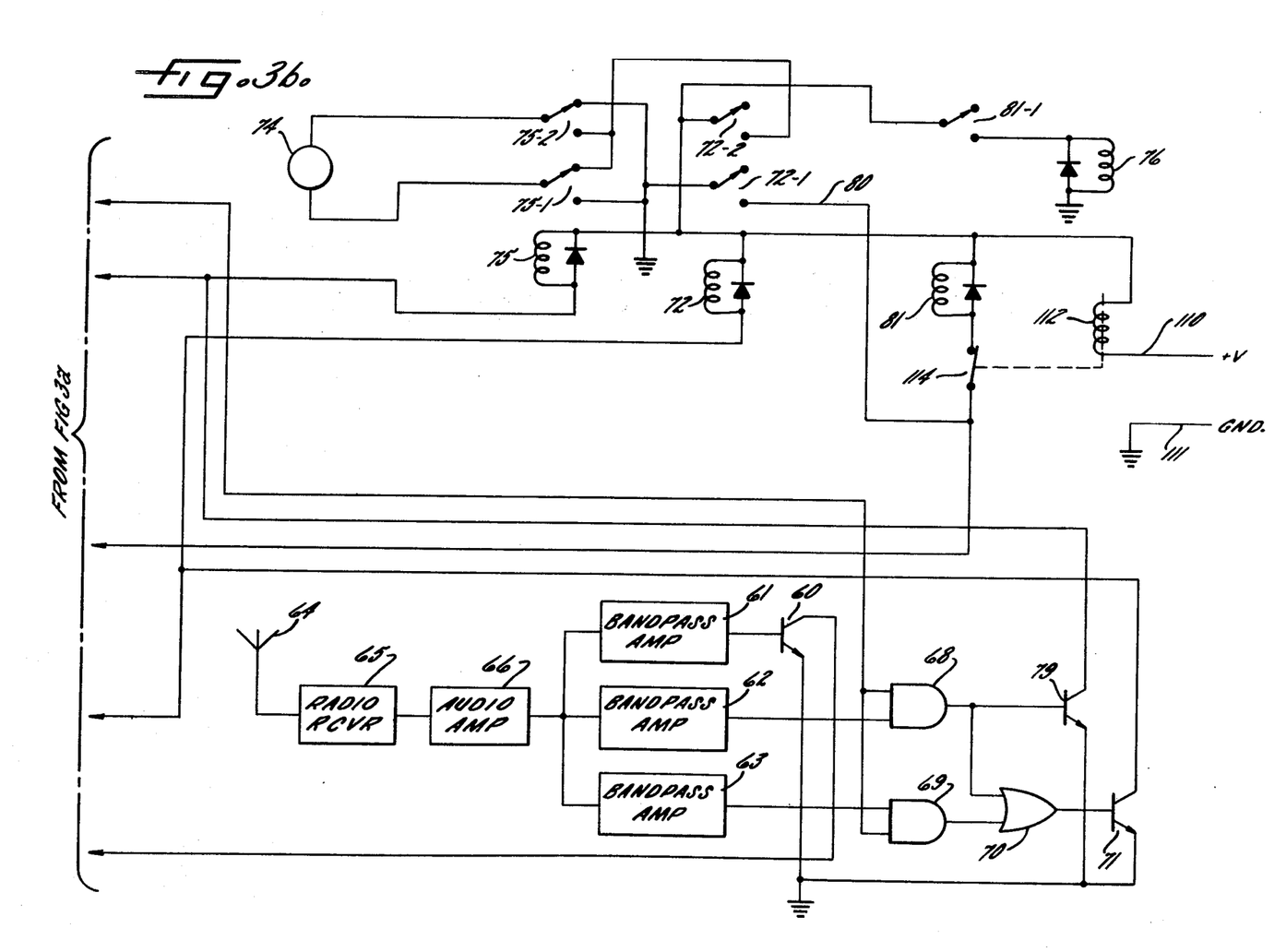

While FIGS. 3a and 3b illustrate an embodiment of the invention which utilizes both a positive and negative voltage in setting the reference level, it should be noted that the system may be operated using a single polarity supply, with the reference levels adjusted accordingly. Thus, references herein to nulling a signal are intended to encompass causing the signal to correspond to a predetermined reference level, which may be zero, positive, or negative with respect to ground.

To accept the electrical signal from compass 20 and to condition it for use by the remaining circuitry, an amplifier 44 is provided with its input coupled via resistor 45 to node 41 and its output coupled to low pass filters 46 and 47. The Yaw control 48 is coupled between the amplifier output and its inverting input, thereby allowing amplifier gain adjustment in a known manner. Low pass filters 46 and 47 are provided to prevent relatively small variations in the compass signal, such as might be caused by rolling of the vessel, from affecting the remaining circuitry. The outputs of the filters 46 and 47 are coupled to inputs of level detectors 48 and 49 respectively. Level detector 48 is arranged to provide a logic 1 output in response to a positive signal from its corresponding filter while level detector 49 is arranged to provide a similar output in response to a negative signal from its filter. It should therefore be appreciated that a positive logic level produced by level detector 48 results from a course change in a first direction while a positive logic level produced by level detector 49 results from a course change in the opposite direction.

To continually monitor the heading of the vessel, the logic output signals of level detectors 48 and 49 are coupled to AND gates 50 and 51 respectively. In the manual mode, manual/automatic flip-flop 52 is caused to assume its set condition thereby driving its Q output high and providing an enabling signal for AND gates 50 and 51. The outputs of AND gates 50 and 51 are coupled through amplifiers 54 and 55 respectively for driving servo motor 35, which, it is recalled, is mechanically coupled via gear 37 to the rotatable compass assembly.

The operation of the compass servo loop, which serves to maintain the compass case in a predetermined angular relationship with the compass card, may be summarized as follows: When a course change causes the foregoing relationship to be disturbed, the level of the voltage at node 41, which indicates the direction of change, is amplified and filtered and causes one of the level detectors 48 or 49 to produce an output. Assuming that the compass card has exposed a greater portion of the photoresistor to illumination, the voltage level at node 41 rises causing the output of amplifier 44 to decrease. If the deviation is of sufficient magnitude to pass low pass filter 47, a positive output is produced by level detector 49 causing a positive output from AND gate 51. This output is amplified by amplifier 55 causing servo motor 35 to turn in a direction to rotate the compass case such that a greater portion of the photoresistor will be shielded, leaving the compass case and compass card in their original condition, but rotated with respect to the vessel. A course change in the opposite direction will act through low pass filter 46, level detector 48, AND gate 50, and amplifier 54 to drive the servo motor in the opposite direction. The end result, however, is to continue to hold the compass at a null position for any heading of the craft as long as the servo loop is enabled. This feature, in conjunction with the servo loop diabling to be described below, provides what may be termed an automatic course memory.

It should be noted that the system is caused to assume the manual mode by causing flip-flop 52 to assume its set condition. A power-on reset module 56 is coupled to the set input of flip-flop 52 to assure that it assumes its set state when power is initially applied to the circuit. Thus, the system always "comes up" in the manual mode, affording the operator the opportunity to select a heading before entering the automatic mode. The manual/automatic switch 58 is provided as an input to OR gate 59 to control the condition of flip-flop 52. A momentary depression of switch 58 provides a clock signal to flip-flop 52 causing it to change state. Thus, successive depressions of switch 58 cause the system to alternately assume the manual and automatic modes. An indicator light may be provided on the front panel and driven in response to flip-flop 52 for indicating the system mode.

In the manual mode, the helm of the vessel is declutched from the automatic steering system control and is free for operation in the normal manner. If the operator changes the heading by turning the helm, the only result is the operation of the above described servo loop to maintain the compass case in its predetermined alignment with the compass card.

Figure 4:
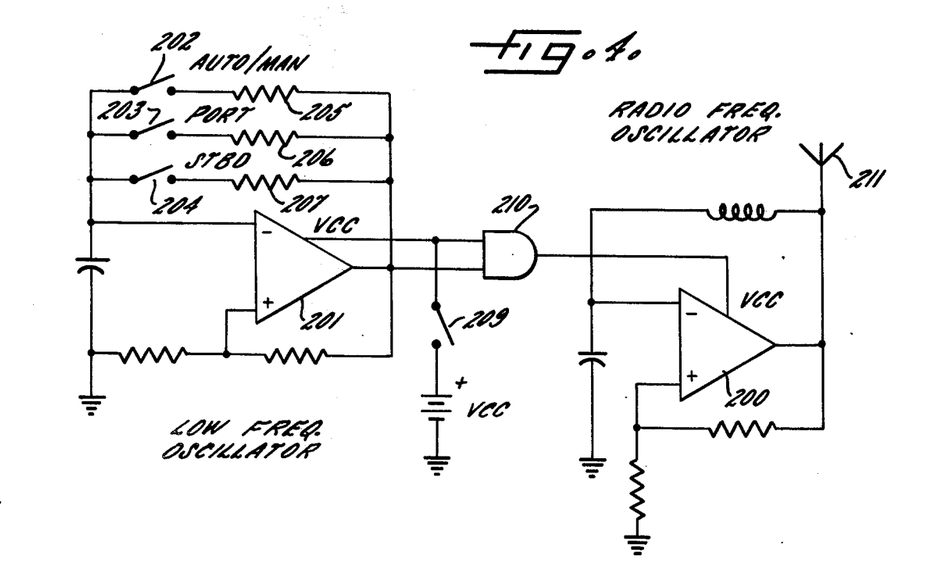
FIG. 4 is a circuit diagram of a preferred embodiment of the wireless remote control unit.

In accordance with one aspect of the invention, a wireless control is provided to control the vessel from a location remote from the helm. One embodiment of such wireless control is illustrated in FIG. 4. An amplifier 200 and its environmental components, comprise a radio frequency oscillator which is adapted to oscillate, for example, at 100 MHz. A second oscillator including amplifier 201 is adapted to operate at one of three low modulating frequencies. The particular frequency is determined by the closure of one of switches 202, 203, or 204 which insert in the feedback loop of the amplifier oscillator one of the resistors 205, 206, or 207, respectively. The values of the resistors 205, 206 and 207 are selected to provide three distinct modulating frequencies such as 400, 650, and 980 Hz. respectively. For example, if auto/manual switch 202 is depressed, resistor 205 is inserted in the feedback path causing amplifier 201 to oscillate at 400 Hz. Power switch 209, which may be ganged to each of switches 202–204, or may be independently operated if desired, provides power to the unit and an enabling signal to modulating AND gate 210. Thus, the 100 MHz. output is 100% amplitude modulated at 400 Hz. and transmitted via antenna 211.

Referring to FIG. 3b, there is shown the means for responding to the transmitted radio signal, including antenna 64 for receiving the signal and a conventional radio receiver 65 for demodulating the signal. The demodulated signal is applied to audio amplifier 66 where it is amplified and coupled to bandpass amplifiers 61–63. Each of the bandpass amplifiers is adapted to respond to one of the three modulating frequencies; in the illustrated embodiment bandpass amplifiers 61, 62 and 63 are responsive to signals of 400, 650 and 980 Hz. respectively. Bandpass amplifier 61, which is responsive to the 400 Hz. signal, produces a logic output which is coupled through transistor 60 and OR gate 59 to the clock input of the flip-flop 52. Thus, the automatic/manual switch 202 on the remote control unit, may be used just as switch 58 on the control panel for controlling the steering system operating mode.

To control the steering of the vessel from the remote control unit, switches 203 and 204 are provided to steer the vessel to the port and starboard respectively. In a manner similar to that described above, depression of switch 203 causes an output from bandpass amplifier 62, while depression of switch 204 causes an output from bandpass amplifier 63. These signals are coupled to AND gates 68 and 69 respectively. It is seen that AND gates 68 and 69 are enabled by a positive logic level at the Q output of flip-flop 52. In other words, AND gates 68 and 69 are enabled only when the system is in the manual mode. The outputs of both of AND gates 68 and 69 are coupled to the inputs of OR gate 70, whose output in turn controls transistor 71. When either of the outputs of AND gates 68 or 69 is high, transistor 71 conducts, energizing the coil of relay 72 and providing driving power to the steering motor 74. Steering motor 74 is a reversible DC motor whose direction of rotation is controlled by direction control relay 75. When relay 75 is in its deenergized condition, and power is applied to motor 74, it will rotate in a first direction. When relay 75 is energized in conjunction with relay 72, the direction of rotation will reverse.

As will be more fully described below, the motor 74 is coupled to the vessel steering system via a clutch (not shown). When the clutch is energized in response to current flow through clutch coil 76, the steering motor is adapted to control the steering of the vessel. As the Q output of flip-flop 52 is maintained in a low condition when the system is in the manual mode, the clutch control transistor 78 is maintained nonconducting leaving the clutch coil 76 normally deenergized. As described above, this decouples the steering motor from the steering system, leaving it in its normal condition for manual operation.

The signals provided by the remote control unit are adapted to control the motor and clutch arrangement described above. Referring to FIG. 4, it is seen that when the starboard switch 204 is depressed, a 100 MHz. signal modulated at 980 Hz. is transmitted by the remote control unit. This signal is received by antenna 64 and applied to the input of bandpass amplifiers 61–63. As bandpass amplifier 63 is tuned to 980 Hz., it will generate a logic output which is coupled to AND gate 69. It is recalled that the system, being in the manual mode, provides an enabling signal to both AND gates 68 and 69. Therefore, the signal produced by bandpass amplifier 63 will cause the output of AND gate 69 to rise, causing a high signal at the output of OR gate 70, further causing transistor 71 to conduct. As described above, this energizes motor control relay 72, applying power to the steering motor 74, causing it to rotate in a first direction. In addition, conductor 80 is coupled between a normally open contact 72–1 of the motor control relay 72 and the coil of the clutch relay 81. It is therefore seen that transistor 71 not only causes the motor to rotate, but in addition causes the clutch relay 81 to be energized, providing current to clutch coil 76 and engaging the clutch. Thus, although the clutch is normally disengaged while in a manual mode, a steering command from the remote control unit causes a temporary clutch engagement.

The system responds in a similar manner to a port steering command from the remote control module. Referring to FIG. 4, it is seen that depression of port switch 203 causes the generation of a 100 MHz. signal modulated at 650 Hz. This signal is coupled through bandpass amplifier 62 and provides a logic 1 to AND gate 68 which is coupled to OR gate 70, causing the motor to be energized and the clutch to be engaged as described above. In addition, the output of AND gate 68 is coupled to transistor 79 which energizes direction control relay 75, causing contacts 75—1 and 75—2 to reverse the polarity of voltage applied to the main drive motor 74. Thus, the motor will be energized to rotate in the direction opposite to that considered above. It should be apparent that the motor will continue to rotate, and the clutch to be engaged, as long as the particular switch on the remote control unit is depressed.

It will be appreciated from the foregoing that the vessel may be steered in a normal manner or via the remote control unit to assume any desired heading. While the vessel is thus manually controlled, the compass servo loop continually monitors the heading and nulls the output of the compass, providing a form of internal course memory.

In accordance with another important aspect of the invention, when it is desired to maintain the course of the vessel on the present heading, the automatic steering system may be switched to the automatic mode. This may be accomplished by a momentary depression of switch 58 on the control panel or a momentary depression of switch 202 on the remote unit, either of such actions causing flip-flop 52 to change state.

Causing flip-flop 52 to assume its reset state has several effects on the control circuitry. As the Q output is driven to a low level, the compass servo loop is disabled by removing the enabling signal from AND gates 50 and 51. Additionally, the enabling signal is removed from AND gates 68 and 69, thereby preventing the manual steering of the vessel from the remote unit. The $\overline{Q}$ output of flip-flop 52 is driven to a high level, providing base drive to transistor 78, energizing clutch control relay 81 and activating the clutch via clutch coil 76. Thus, the steering motor 74 is locked to the steering system of the vessel at all times in the automatic mode.

Disabling of the compass servo loop locks the compass case to the vessel to remember the selected heading and allows the automatic steering system to sense deviations from that heading. As the compass case is now fixed with respect to the vessel, any change in the vessel heading will be exhibited as a change in voltage at node 41. Just as in the manual mode, such change in voltage will be amplified by amplifier 44, filtered by low pass filters 46 and 47 and compared to a zero reference by level detectors 48 and 49. The course deviation will then appear as a logic level output from level detector 48 or 49 depending upon the direction of deviation.

Assuming that a course deviation has produced an output from level detector 48, it is seen that the direction control flip-flop 82 is caused to assume its set condition thereby preventing AND gate 181 from producing an output. Transistor 83 will remain cut-off maintaining the direction control relay 75 in a deenergized condition preparing the motor to run in a first corrective direction. The positive signal from level detector 48 is also coupled through OR gate 182 to the input of AND gate 84. As AND gate 84 is provided with an enabling signal from the $\overline{Q}$ output of flip-flop 52, the AND gate will be satisfied, thereby providing a signal to reset motor run flip-flop 85. The Q output of flip-flop 85 is driven low, removing a driving signal from lamp driver 86. As will be more fully described below, lamp driver 86 provides a signal to photocoupled pair 87 to illuminate the photoresponsive switch 88 for disabling an integrating amplifier 89. When the driving signal is removed, the photoresponsive switch 88 is opened, thereby preparing integrator 89 for operation. As the Q output of flip-flop 85 is also coupled to the reset input of flip-flop 90, the reset signal is removed from flip-flop 90. However, as no other signal is provided to flip-flop 90 at this time, it remains in its reset condition. The $\overline{Q}$ output of flip-flop 85 being driven high by the aforementioned signal from AND gate 84, provides an enabling signal to AND gate 91, preparing it for future operation. The $\overline{Q}$ output of flip-flop 85 also causes transistor 92 to conduct thereby energizing relay coil 72 and providing driving power to the steering motor 74. The motor will begin to rotate in the direction determined by the deenergized state of relay 75.

Mechanically coupled to the steering motor 74 is a small DC generator 94 which produces a voltage whose polarity is dependent upon the direction of rotation of the steering motor and whose magnitude is proportional to the speed of rotation. This voltage is coupled through resistor 95 to the input of integrator 89. The opening of switch 88, which has been described above, removes the short circuit from across capacitor 96 thereby allowing integrator 89 to integrate the voltage produced by generator 94. The output of integrator 89 is coupled to the reference inputs of the level detectors 48 and 49. It should be appreciated that when the switch 88 is closed, the output of the integrator remains at a zero level thereby providing a zero reference for both of the level detectors 48 and 49. However, with the switch 88 open, the reference input to the level detectors is controlled by the output of the integrator. When the integrator output equals the level of the signal passed by the low pass filters, the level detector output will be driven to a zero level. In the case under consideration, it has been assumed that level detector 48 provides an output signal in response to a positive signal from low pass filter 46. Thus, the generator is arranged to cause the output of integrator 89 to rise to a positive level. When the level from the integrator equals that from low pass filter 46, the output of level detector 48 will be driven to a zero level. Discriminator or falling edge detector 98 detects this transition in the output signal from level detector 48, and in response thereto produces a pulse which accomplishes a dual function. The pulse is coupled to the input of AND gate 91 which causes flip-flop 90 to be set, driving its Q output to a high level. This signal in turn is applied to inhibit circuit 99 which clamps the outputs of both level detectors 48 and 49 to a zero level. In this condition the circuit will be insensitive to any signals produced by the compass 20. The pulse produced by falling edge detector 98 is also applied to the clock input of direction control flip-flop 82. Thus, direction control flip-flop 82 changes state causing the reversal of the steering motor 74. In the situation under consideration, the direction control flip-flop had been in its set condition maintaining the output of AND gate 181 at a low level. In response to the clock signal, the flip-flop 82 assumes its reset condition thereby satisfying AND gate 181 and providing base drive to transistor 83. Transistor 83 conducts energizing direction control relay 75 and causing a reversal of rotation of motor 74. The vessel steering system is then driven in the opposite direction causing the helm to return from its corrected position toward its initial position. The generator 94 rotates in the opposite direction producing a signal which is opposite in polarity to that produced previously. Integrator 89 integrates this signal back to a zero level. When a zero level is reached, a zero crossing detector 100 emits a brief pulse which is applied to the clock input of motor run flip-flop 85, causing it to change state. The Q output of the motor run flip-flop is driven to a low level removing the base drive from transistor 92 and deenergizing steering motor 74, stopping the travel of the vessel rudder. The Q output of motor run flip-flop 85 which is simultaneously driven to a high level, causes flip-flop 90 to be reset, driving its Q output low and removing the driving signal from inhibit circuit 99. Thus, the level detectors are again allowed to sense course deviations. If the vessel is again on course, no further action occurs. If, however, the voltage level at node 41 indicates an off-course condition, a similar cycle occurs.

It should be apparent from the foregoing that an off-course deviation in the opposite direction will act through low pass filter 47 and level detector 49 to produce a similar result. In that case, however, direction control relay 75 is energized for the initial correction and deenergized for returning the helm toward its initial position.

The Yaw control, herein potentiometer 48, is provided to tailor the response of the steering system to a particular vessel and the particular conditions in which it is sailing. It is apparent that the Yaw control sets the gain for amplifier 44 and thereby determines the level of voltage applied to the level detectors 48 and 49 for any given course deviation. As the amount of correction is determined by the length of time it takes integrator 89 to produce a signal equal in magnitude to the signal provided by amplifier 44, the setting of resistor 48 may be adjusted to provide a correction time which matches the particular vessel.

In accordance with one aspect of the invention, means are provided for returning the helm to its initial position after a correction, less a small preset angle. As integrator 89 integrates the voltage produced by generator 94 from a zero level to a level which matches the output of amplifier 44, and then integrates the reverse voltage back to a zero level, it should be appreciated that, in the absence of losses, the rudder will return to its initial position. However, in practicing my invention, I prefer to return the rudder to its initial position less a small preset angle so that the vessel may be automatically trimmed to suit varying vessel speeds and sea conditions. To that end, I provide a slight preselected delay within lamp driver 96. It is recalled that at all times, except during automatic course corrections, the photocoupled pair 87 is provided with a driving signal causing switch 88 to remain in a shorting relationship across capacitor 96. This assures that no voltage will be integrated by integrator 89, and additionally provides a zero reference level for level detectors 48 and 49. The enabling of the integrator by removing the driving signal from lamp driver 86 thereby opening switch 88 has been described. In practicing the invention, I prefer to introduce a delay of a fraction of a second in the response of lamp driver 86 to a falling Q output from flip-flop 85 so that the switch 88 remains closed for a fraction of a second at the initiation of a correction cycle. Thus, the generator 94 produces a signal at the initiation of a correction which is not integrated by integrator 89. As this slight initial correction is not sensed, the rudder will not be returned the full distance in the return phase of a correction cycle.

The automatic trim control thus provided allows the rudder to assume a new neutral position at the end of each correction. Ultimately the system causes the rudder to assume a neutral position which will hold the vessel on course with minimal course deviations. It is well known that the variables encountered in piloting a vessel, such as varying sea conditions changing speeds, etc, cause the vessel to react differently to the helm. By allowing the automatic pilot to automatically trim the rudder in the manner described above, the automatic steering system achieves a neutral rudder position which will compensate for these variables, eliminating many of the "retuning" problems associated with prior art automatic pilots.

The feedback element in my automatic pilot, herein the generator 94 which is mechanically coupled to the main drive motor 74, not only is important in achieving automatic trim correction, but additionally is advantageous in simplifying the installation of my system. In contrast to many prior art automatic pilots, no feedback element need be attached to any of the ship's steering elements. The generator 94 is incorporated within the drive package, and only a single drive connection need be made to the ship's steering system. Additionally, the generator-integrator arrangement is responsive to both the speed of rotation and the time of rotation of the steering motor, thereby accurately indicating the amount of actual helm movement.

Figure 5B:
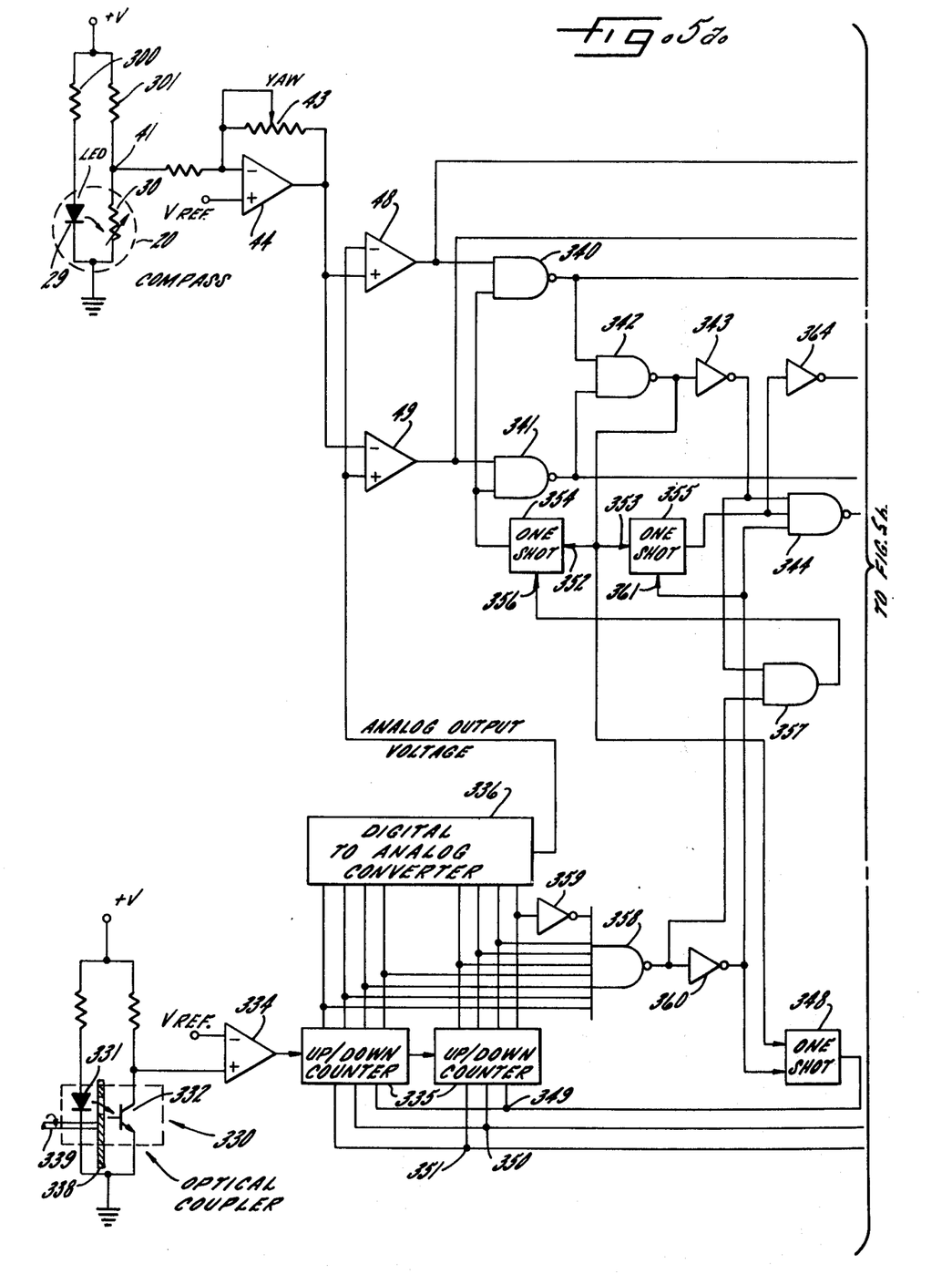

Turning now to FIGS. 5a and 5b, there is shown a logic diagram similar to FIGS. 3a and 3b and illustrating the circuitry of a modified form of an automatic pilot embodying the present invention. While the embodiment of FIGS. 5a and 5b operates as generally set forth above, certain of the circuit details have been modified. For example, the means for monitoring the direction and amount of rudder movement operates digitally in the FIG. 5a and 5b embodiment. Additionally FIG. 5b illustrates transistorized power control for the steering motor and associated circuitry.

Turning to FIG. 5a in detail, there is shown a compass 20 similar to that described previously and forming the sensing input of the circuit. Resistors 300 and 301 supply power to the LED 29 and current to the photoresistor 30 respectively within the compass 20. An amplifier 44, including a Yaw control 43 for adjusting the gain thereof, is coupled to the output of the compass. It is noted that in the illustrated embodiment, a unipolar power source is used, the compass being arranged between a suitable positive source of voltage and circuit common. It is also seen that an intermediate reference potential is provided, set, for example, at one half of the power supply potential. The reference potential is applied to the non-inverting input of amplifier 44 for comparing the output voltage of the compass 20 to such reference potential. The output of amplifier 44 is coupled to the non-inverting input of level detector 48 and to the inverting input of level detector 49. A compass servo loop is provided, similar to that described above, including NAND gates 50 and 51 and inverting drivers 54 and 55 for powering the compass servo motor 35. Gates 50 and 51 are enabled in the manual mode to respond to the signals produced by level detectors 48 or 49 for driving the compass servo motor 35 to maintain the output of the compass, as measured at node 41, at a predetermined level.

For establishing the mode of operation of the system, a mode selector flip-flop 52 is provided having its Q output coupled to an input of each of NAND gates 50 and 51. When the flip-flop is in its reset condition, gates 50 and 51 are enabled thereby to activate the compass servo loop. A power-on reset module 56 is coupled to the reset input of flip-flop 52 for assuring that the system is powered up in the manual mode. In the manual mode, the $\bar{Q}$ output of flip-flop 52, which is coupled to the input of an inverting driver 310 serves to illuminate a manual indicator 316. Inverting driver 311, also having its input coupled to the $\bar{Q}$ output of flip-flop 52 provides a low voltage level at the output thereof for enabling the manual operation of the motorized steering system, as will be explained below.

When it is desired to switch to the automatic mode, a mode control one shot multivibrator 319 is actuated to generate a trigger pulse which is applied to the clock input of the flip-flop 52. It is noted that the one shot 319 may be actuated by a momentary depression of switch 58 or by operation of the wireless control as explained above. Clocking flip-flop 52 into its set condition disables the servo loop described above and enables a control loop to maintain the existing course. The $\bar{Q}$ output of the flip-flop is driven low to disable NAND gates 50 and 51 and to extinguish the manual indicator 316. The Q output of the flip-flop, having assumed a high level, acts through driver 312 to illuminate the automatic indicator 317, and through driver 313 to provide a signal for energizing the clutch, locking the drive motor 74 to the steering system. Finally, the Q output of flip-flop 52, being coupled to one of the inputs of AND gate 320, when driven high, allows the AND gate to respond to internally generated signals for enabling AND gates 321 and 322 to respond to the direction control flip-flop 82.

For monitoring the direction and amount of rudder movement, means are provided for producing a digital signal related to rudder movement, shown herein as optical tachometer 330. The tachometer 330 includes an LED 331 and a phototransistor 332 in optical communication, coupled across the power supply in conjunction with associated biasing elements. The output of the phototransistor 332, taken at the collector thereof, is coupled to the non-inverting input of a level detector 334. The inverting input of the level detector is referenced to one half battery voltage, the aforementioned reference potential. Interposed between the LED 331 and the phototransistor 332 is a chopper having a chopper disc 338 mounted for rotation on a shaft 339, the shaft being coupled so that rotation of the motor periodically interrupts the light beam coupling the LED 331 to the phototransistor 332. The elements described thus far operate as a digital tachometer producing a pulsed signal at the output of level detector 334, with the number of pulses indicating the amount of steering motor rotation. The output of level detector 334 is coupled to the clock input of an up/-down counter 335. As will become more apparent, the counter 335 is adapted to monitor the direction and amount of rudder movement, being controlled to count up from a quiescent state during port rudder corrections, and down during starboard corrections. Coupled to the digital outputs of counter 335 is a digital to analog converter 336 adapted to produce an analog voltage having a magnitude dependent upon the count within the counter. The counter 335 is arranged so that in its quiescent state, the stored count is maintained at one half maximum. For example, if the counter were provided with a total count capability of 0–255, in the quiescent condition, a count of 127 would be maintained. Accordingly, the output of digital to analog converter 336 is normally maintained at approximately one half the power supply voltage, or, in other words, at the aforementioned reference potential. Since the output of the digital to analog converter 336 is coupled to the reference inputs of the level detectors 48 and 49, it is seen that in the quiescent condition, the reference signal supplied to the level detectors is at approximately one half the power supply voltage. Accordingly, it is this reference voltage to which the output signal of amplifier 44 is compared in order to determine course deviations.

The remaining logic circuitry, being similar in structure to the FIGS. 3a–b embodiment, will be described in conjunction with an operational sequence of the system. Assuming that the system is in the automatic mode and that a course deviation to the starboard causes the output of amplifier 44 to be driven above the reference level, level detector 48 senses such condition and drives the output thereof from its normally low quiescent state to a high state. As will be explained in more detail below, the commoned enabling inputs of NAND gates 340 and 341 are normally maintained in the high condition. Accordingly, NAND gate 340 will be satisfied driving its output low. The output of NAND gate 340 is coupled to the set input of direction control flip-flop 82 so that the low going output of the NAND gate sets the flip-flop, placing it in the port steering mode. The output of NAND gate 340 is also coupled to the input of a NAND gate 342 which, in turn, has its output coupled to an inverter 343. Accordingly, the output of NAND gate 342 will be driven to a high level, driving the output of inverter 343 low. As the output of inverter 343 is coupled to one input of a three input NAND gate 344, the output of such NAND gate will be driven high. As a result, AND gate 320 will be satisfied, driving its output high and enabling AND gate 321. The output of inverter 315 will thereby be switched to a low level causing the steering motor to rotate in a corrective direction, in this case the port direction.

The output of NAND gate 342 in addition to initiating motor rotation, acts upon the rudder movement sensing circuitry, being coupled to the trigger input of a one shot 348. The rising edge of the signal at the output of the NAND gate 342 will trigger the one shot 348 to drive the output thereof low for the predetermined period thereof. The output of the one shot 348 is coupled to input 349 of the counter 335, such input being adapted to maintain the counter in its quiescent condition, at the count of 127 in the example. Thus, even though the enable input 351 of the counter was activated by the high output of NAND gate 320, the counter will be maintained in its quiescent condition for the period of the one shot 348. The period of the one shot is adapted to correspond to the length of a predetermined number of tachometer pulses, such as two or three pulses, so that the counter 335 will "miss" these first pulses. As will become more apparent, this action results in trimming of the rudder to a new neutral position, corresponding to the initial position less a small preset angle. At the termination of the period of the one shot 348, the output thereof will rise to a high level enabling the counter 335 to count the pulses produced at the output of the level detector 334.

A gating arrangement including NAND gate 358 and inverter 359 is coupled to the digital outputs of the counter 335 for producing a low signal when that counter is in its quiescent (127 in the example) condition. The output of NAND gate 358 is driven to a high level, whenever the counter is driven from its quiescent condition causing inverter 360, coupled thereto, to switch its output low. Since the output of inverter 360 is coupled to one of the inputs of NAND gate 344, it is seen that the output of NAND gate 344 will be maintained at a high level whenever the counter is in its non-quiescent condition. The high level produced by NAND gate 344 maintains AND gate 320 satisfied during an entire automatic course correction cycle, thereby to provide an enabling signal to both AND gates 321 and 322, allowing the circuitry to energize the steering motor, and to provide an enabling signal to the input 351 of the counter 335, enabling the counter to respond to clock pulses produced by the rudder tachometer.

For controlling the mode of the counter in response to the direction of motor rotation, the up/down input 350 of the counter 335 is coupled to the $\overline{Q}$ output of the direction control flip-flop 82. In the present example, the $\overline{Q}$ output is at a low level, causing the counter to operate in the up counting mode. As a result, each pulse produced at the output of level detector 334 serves to increment the counter 335, driving the digital signals at its outputs incrementally higher. The digital to analog converter 336, in response thereto, incrementally increases its analog voltage output which, as noted above, is coupled to the reference inputs of the level detectors 48 and 49. Accordingly, when the rudder is moved by an amount proportional to the error signal, the sensing circuitry, level detector 48 in this case, will respond by driving its output low, thereby driving the output of NAND gate 340 high and satisfying NAND gate 342. The output of NAND gate 342 is coupled to inputs 352 and 353 of one shots 354 and 355 respectively, serving to trigger both of the one shots. Because of the high signal maintained on input 356 of the one shot 354 by AND gate 357, the one shot will switch its output to a low level, but will not begin to time out. It is seen that the output of the one shot 354 is coupled to an input of each of NAND gates 340 and 341. As a result, both of such NAND gates are disabled, preventing the sensing circuitry from responding to the compass during the remainder of the course correction cycle. In other words, the portion of the circuitry serving as a detector responsive to the compass is disabled during this phase of circuit operation.

Because input 361 of one shot 355 is maintained low by inverter 360 at the time NAND gate 342 produces the aforementioned trigger signal, the one shot 355 will be triggered and will drive the output thereof low for the predetermined period associated therewith. As a result, a clocking signal will be coupled through inverter 364 to the clock input of direction control flip-flop 82. The flip-flop will, thus, change state, deenergizing driver 315, but satisfying AND 322 to energize driver 314. As a result, the direction of rotation of the steering motor will be reversed, to return the rudder toward its initial position.

In addition to reversing the direction of motor rotation, clocking of the flip-flop 82, by driving the $\overline{Q}$ output of the flip-flop low couples a low signal to the input 350 of the counter causing the counter to operate in the count down mode. Accordingly, as the motor rotates and the digital tachometer produces pulses, the count within the counter will be decreased toward the quiescent level. Similarly, the output voltage of the digital to analog converter 336 will be decreased, but, since the detecting circuit is disabled, such decrease will be without effect.

The counter 335 will continue to count down until the quiescent count (127 in the example) is reached, at which point the output of AND gate 358 will be driven to a low level. In response thereto, the output of inverter 360 is driven high, providing a high signal to the input 361 of the one shot 355 and again triggering such one shot to drive the output thereof low for a predetermined timing period. This low signal is applied to NAND gate 344 to maintain the output thereof high and to continue to apply an enabling signal to the AND gates 321 and 322. The low signal also acts through inverter 364 to again clock the flip-flop 82. As a result, the flip-flop changes state, the outputs thereof acting through inverter 321 and driver 315 to again reverse the direction of steering motor rotation. The period of one shot 355 is relatively short, being adapted to instantaneously but briefly reverse the direction of current flow in the steering motor, to stop the motor without coast. Realizing that the first two or three counts produced by the rotation of the steering motor were not counted by the counter, and seeing that the motor is stopped precisely when the count within the counter returns to the quiescent value, it is seen that the motor is returned to its initial position less a small preset angle, with the advantages described above. When the output of one shot 355 returns to its high level, NAND gate 344 will be satisfied, coupling a low signal to the input of AND gate 320 and removing the enabling signal from AND gates 321 and 322 as well as from the input 351 of the counter 335. The one shot 348 is triggered by inverter 360 when the counter returns to its quiescent level, holding the input 349 low for the motor stopping operation, to prevent the counter from responding to such operation.

The low-going output of NAND gate 344, in addition to the functions described above, causes the output of AND gate 357 to be driven to a low level which allows the one shot 354 to begin to time out. The interval associated with one shot 354 is rather long, such as one second, to allow the system to stabilize before the output of one shot 354 will return to a high level, re-enabling the NAND gates 340 and 341 to allow the sensing circuitry to sense new course deviations.

It will be apparent that the circuitry operates in a similar fashion to perform a course correction in response to a course deviation in the opposite or port direction.

Turning now to the power portion of the circuitry, it is seen that the drive motor 74 is coupled in a transistorized bridge circuit for applying power thereto and controlling the direction of rotation. Port rotation commands, such as those produced by driver 315, are coupled through a resistor 370 to the base of a transistor 371. Accordingly, transistor 371 will be turned one, turning on transistor 372 and allowing current flow from the positive source to the left hand brush of the motor 74. Current through transistor 371 will also be coupled through resistor 373 to the base of transistor 374 driving transistor 374 into conduction and completing the path for current flow through the armature and to circuit common. Starboard steering commands, such as those produced by driver 314, act in a similar fashion, and are coupled through a resistor 375 to drive transistor 376 into conduction. The conduction of the transistor 376 drives the transistor 377 into conduction, drawing current from the positive source to the right hand brush of the motor 74. Similarly, current flow through the transistor 376 and a resistor 378 drives a transistor 379 into conduction completing the path for current flow through the armature, but causing the motor to rotate in the direction opposite to that considered above.

For energizing the clutch 76 to couple the steering motor to the steering system of the vessel, a transistor 380 is provided for supplying current to the clutch coil 76. In the automatic mode, the transistor 380 is driven into conduction by inverter 313, base drive being supplied through resistor 381 and diode 382. In this condition, the steering motor remains locked to the vessel steering system so long as the system is maintained in the automatic mode. When the system is switched to the manual mode, the output of driver 313 is switched to a high level, removing the source of base drive from transistor 380 and deenergizing the clutch coil 76. A pair of diodes 383, 384 are provided, having their common anodes coupled to the resistor 381 and their cathodes coupled to the collectors of transistors 379, 374, respectively. It will, therefore, be appreciated that whenever transistor 374 or 379 is conducting (in response to port or starboard steering motor driving signals), the diode associated therewith will be forward biased to provide base drive to transistor 380, causing such transistor to conduct and supply current to the clutch coil. Such action is without effect in the automatic mode, but serves to actuate the clutch when the motor is energized in the manual mode.

For controlling the steering motor in the manual mode, a pair of switches 390, 391 are provided coupled to the output of inverter 311 which, it is recalled, is maintained in a low condition in the manual mode. Switch 390, when closed, causes transistor 376 to conduct, and thereby energizes the motor for rotation in the starboard direction. Similarly, switch 391 when closed, causes transistor 371 to conduct to energize the motor for rotation in the port direction. Recalling that the diodes 383 or 384 also cause transistor 380 to conduct to pull in the clutch, it is seen that motorized steering corrections may be accomplished simply by operation of switches 390 or 391.

In a manner similar to that described in conjunction with the FIG. 3a and b embodiment, a wireless course change capability is also provided in the instant embodiment. As described above, radio receiver circuitry, responsive to a transmitter, includes an antenna 64, a radio receiver 65, an audio amplifier 66 and bandpass amplifiers 61–63. Operation of the wireless unit to cause the bandpass amplifier 61 to respond, couples a signal through driver 394 to trigger the mode control one shot 319 for changing from the automatic to manual or manual to automatic modes. Operation of the wireless unit by depression of the port switch thereon causes the bandpass amplifier 62 to respond, driving transistor 395 into conduction and coupling a port rotational command to the base of transistor 371. Similarly, operation of the starboard switch on the wireless unit drives transistor 396 into conduction for rotating the motor in the starboard direction. As a further feature, it is seen that the emitters of both of transistors 395 and 396 are coupled to the output of inverter 311 so that the steering capabilities of the wireless unit are functional only in the manual mode.

The automatic pilot herein disclosed is adaptable to vessels having various types of steering mechanisms. The system is easily connected to any mechanical steering system, such as those using cables, teleflex, Morse steering, etc. by simply attaching a drive sprocket to the steering wheel shaft. Such drive sprocket may be chain coupled to the steering motor 74, that coupling being the only connection between the automatic steering system and the vessel steering system. When applied to a vessel having hydraulic steering, a hydraulic steering pump may be incorporated into the drive control for rotation by a steering motor 74. In that case, hydraulic lines are coupled to the ship's steering system providing the only connection thereto.

In accordance with another aspect of the invention, means are provided for allowing an operator to override the steering system, without removing the system from the automatic mode. Referring again to FIG. 3b, it is seen that the main power, which is supplied to the system via input terminals 110 and 111, is coupled through a coil 112 which is in proximity to magnetic reed switch 114. The degree of coupling between the coil and reed switch is arranged such that the switch remains in its normally closed condition at all times, except when excessive current is drawn by the system. When steering motor 74 draws excessive current due to an excessive torque demand, the current through coil 112 causes magnetic reed switch 114 to open. As the reed switch 114 is in the circuit of clutch control relay 81, relay coil 81 is deenergized thus removing the power from clutch coil 76 and declutching the steering motor 74 from the steering system. It should be appreciated that when the system is declutched, the steering motor current will decrease, allowing reed switch 114 to reclose. However, if the excessive torque demand on motor 74 remains, the switch will oscillate preventing motor 74 from driving the helm beyond its preset torque limit.

Thus, the circuitry described above sets a torque limit above which motor 74 cannot rotate the helm. If the rudder is driven against its steering stop, or some other obstruction, the excessive current which the motor will attempt to draw prevents further rotation and thereby prevents damage to both the steering system and the automatic pilot. Additionally, if an operator attempts to make a course change while the pilot is in its automatic mode, the above described circuit allows such change. It should be apparent, however, that in such a situation, the automatic pilot will attempt to oppose such change to hold the vessel on course. The above described torque limiting circuit will not only allow the operator to override the motor and make the course change, but the oscillating of the reed switch 114 and the clutch 76 will be felt in the steering wheel and will inform the operator that the pilot is in the automatic mode. Thus, having made the change, such as in an emergency situation, the operator is appraised that he should return the pilot to its manual mode to select a new heading.

As described above, the compass unit 20 may be mounted in any out of the way location. This is in contrast to other prior art automatic pilots which precluded mounting the compass near any metallic objects. However, the compass in the automatic pilot described above may be mounted near a metallic object if that object will always remain in its place. Any stationary metallic object will have a constant effect on the magnetic compass which is eliminated by the internal course memory. In other words, when the steering system is put into its automatic mode it remembers the heading seen by the compass at that time. Such heading is maintained independently of any constant distortions in the magnetic field around the compass.

I claim as my invention:

1. An automatic pilot for a vessel having a steering mechanism comprising in combination, means for selecting a desired heading, means including a magnetic compass for producing an output signal dependent upon the amount of deviation from the selected heading, a reversible steering motor coupled to the vessel steering mechanism, detector means responsive to the compass output signal for energizing the steering motor for rotation in a corrective direction to reduce the deviation from the selected heading, means for monitoring the amount of steering motor rotation, means responsive to the monitoring means for reversing the direction of rotation of the steering motor after an amount of corrective rotation which is proportional to the compass output signal, means for inhibiting said detector means while the steering motor is rotating in the reverse direction, and means responsive to the monitoring means for deenergizing the steering motor and re-enabling the detector means after an amount of reverse rotation which is a predetermined amount less than the amount of corrective rotation, whereby the steering mechanism is trimmed to a new neutral position.

2. The automatic pilot as set forth in claim 1 wherein the means for selecting a desired heading comprises a servo loop including the magnetic compass for continually monitoring the heading of the vessel, and means for disabling the servo loop thereby to automatically remember the vessel heading at the time the servo loop was disabled.

3. An automatic steering system for a vessel having a helm comprising in combination, a bidirectional actuator for controlling the position of the helm; a magnetic compass having an electrical output; servo means operable in a first mode for positioning the compass to null the compass output; means for switching to a second mode to activate a control circuit; the control circuit including means for disabling the servo means thereby to remember the vessel heading and serving to cause the compass output to be dependent upon the amount of deviation from the remembered heading, means responsive to the compass output for energizing the actuator to move the helm from an initial position in a direction to reduce the heading deviation, and means responsive to the amount of helm movement for reversing the actuator after a predetermined amount of helm movement to return the helm to the initial position less a small preset angle.

4. The automatic steering system as set forth in claim 3 wherein the predetermined amount of helm movement before actuator reversal is proportional to the magnitude to the compass output.

5. The automatic steering system as set forth in claim 3 further including a wireless remote controller comprising steering command means for producing steering signals, mode command means for producing mode switching signals, and means coupled to both of said command means for transmitting said signals; means for receiving said signals; and means responsive to individual ones of said signals for energizing the actuator and for switching between said first and second modes whereby the vessel may be controlled from a location remote from the helm.

6. An automatic steering system for a vessel having a steering mechanism comprising in combination, a reversible steering motor coupled to the vessel steering mechanism; a magnetic compass having an electrical output; means responsive to the compass output for producing a port deviation signal or a starboard deviation signal in response to port or starboard heading changes respectively; a servo loop operational in a first mode and responsive to said deviation signals for nulling the compass output to monitor the vessel heading; means for switching from the first mode to a second mode for enabling a control loop; the control loop including means for disabling the servo loop to remember the last vessel heading, means responsive to the deviation signals for energizing the steering motor to rotate in a first direction to oppose a heading change, means coupled to the steering motor for producing a correction signal indicating the direction and amount of steering motor rotation, means for reversing the direction of rotation of the steering motor in response to the correction signal reaching a first magnitude proportional to the deviation signal, and means for detecting the reduction of the magnitude of the correction signal to a predetermined minimum magnitude for deenergizing the steering motor, whereby a deviation from the remembered heading causes a bi-directional steering cycle to correct for said deviation.

7. The automatic steering system as set forth in claim 6 wherein said means for producing a correction signal is adapted to produce a signal having a magnitude proportional to the amount of steering motor rotation and a polarity dependent upon the direction of steering motor rotation.

8. The automatic steering system as set forth in claim 6 wherein the means for producing the correction signal comprises a DC generator coupled to the steering motor, an integrator coupled to the DC generator for integrating the generator output, and means responsive to the steering motor energizing means for enabling the integrator.

9. The automatic steering system as set forth in claim 8 wherein the means for deenergizing the steering motor comprises a zero crossing detector coupled to the integrator.

10. The automatic steering system as set forth in claim 8 further including means for delaying the enabling of the integrator whereby an automatic steering correction results in a new neutral position for the steering mechanism to trim the vessel.

11. The automatic steering system as set forth in claim 6 wherein said means for producing a correction signal comprises a digital tachometer coupled to the steering motor for producing pulses in response to motor rotation, a counter coupled to the tachometer for counting said pulses, and an analog to digital converter coupled to the counter for producing a signal having a magnitude dependent on the count within said counter.

12. The automatic steering system as set forth in claim 11 wherein said counter is an up/down counter having an input for controlling the direction of counting, and including means coupled to said last mentioned input for causing said counter to count up in response to steering motor rotation in a first direction and down in response to rotation in the opposite direction.

13. The automatic steering system as set forth in claim 11 including means for enabling the counter to respond to pulses from said tachometer, said enabling means including delay means for causing the amount of steering motor rotation in said first direction to be less than the amount of steering motor rotation in said reverse direction, whereby said steering mechanism is trimmed to a new neutral position.

14. The automatic steering system as set forth in claim 6 wherein said means for detecting the reduction of the magnitude of the correction signal to a predetermined minimum magnitude for deenergizing the steering motor includes means for temporarily re-reversing said steering motor thereby to instantly stop said motor.

15. The automatic steering system as set forth in claim 6 wherein the means for producing the deviation signals comprises an amplifier, means for varying the gain of the amplifier, first and second low pass filter means coupled to the amplifier output, and first and second level detectors coupled to the first and second filter means respectively, whereby the sensitivity of the automatic steering system may be compensated for the characteristics of the vessel.

16. The automatic steering system as set forth in claim 15 wherein the means for producing a correction signal comprises a DC generator coupled to the steering motor for producing a voltage having a polarity dependent upon the direction of steering motor rotation, an integrator coupled to the generator for integrating the voltage produced by the generator, and means responsive to the steering motor energizing means for enabling the integrator.

17. The automatic steering system as set forth in claim 16 further including means for coupling the output of the integrator to the first and second level detectors for comparing the deviation signal to the correction signal.

18. The automatic steering system as set forth in claim 17 further including means for delaying the enabling of the integrator whereby an automatic steering correction results in a new neutral position for the steering mechanism to trim the vessel.

19. The automatic steering system as set forth in claim 18 further including means responsive to the steering motor reversing means for disabling the level detectors, whereby the compass output is ineffective to excite the control loop while the steering motor is operating in the reverse direction.

20. The automatic steering system as set forth in claim 6 wherein said means for producing a deviation signal comprises an amplifier, first and second level detector means coupled to said amplifier, each of said level detectors having a reference input, and means coupling said correction signal to said reference inputs.

21. The automatic steering system as set forth in claim 6 further including a wireless remote controller comprising steering command means for producing steering signals, mode command means for producing mode switching signals, and means coupled to both of said command means for transmitting said signals; means for receiving said signals; and means responsive to individual ones of said signals for energizing the steering motor and for switching between said first and second modes whereby the vessel may be controlled from a remote location.

22. The automatic steering system as set forth in claim 6 further including a clutch interposed between the steering motor and the steering mechanism and means for setting a clutch torque limit whereby the automatic steering system may be manually overridden.

23. The automatic steering system as set forth in claim 22 wherein the torque limit setting means includes means for sensing the steering motor current and means responsive to an overcurrent condition for decoupling the clutch.

24. The automatic steering system as set forth in claim 6 wherein the compass comprises a compass card having at least one translucent sector and one opaque sector, a compass case, bearing means for mounting the compass card for rotation within the compass case, a light sensor mounted within the compass case and adapted to produce a signal dependent upon the amount of light incident thereon, a light source mounted within the compass case for illuminating the light sensor, the compass card interposed between the light source and light sensor for controlling the amount of light incident upon the light sensor, whereby the signal produced by the light sensor is dependent upon the angular alignment between the compass case and compass card.

25. An automatic pilot for a vessel having a steering mechanism comprising in combination, means for producing a deviation signal dependent upon the amount of deviation between an actual heading and a selected heading, a reversible steering motor coupled to the steering mechanism, measuring means for measuring the amount and direction of steering motor rotation, detector means responsive to the deviation signal and to the measuring means for energizing the steering motor for rotation in a corrective direction and for reversing the direction of rotation of the steering motor after an amount of corrective rotation proportional to the deviation signal, means for disabling the detector means during said reverse rotation, and means coupled to the measuring means and responsive solely to the measured amount of steering motor rotation for deenergizing the steering motor when said steering mechanism is returned to a neutral position.

26. The automatic steering system as set forth in claim 25 wherein the measuring means includes delay means for causing the amount of corrective rotation to be greater than the amount of reverse rotation, whereby the steering mechanism is trimmed to a new neutral position.

27. The automatic pilot as set forth in claim 25 wherein the measuring means comprises a tach generator for producing a DC voltage dependent upon the amount of steering motor rotation, and means for integrating said DC voltage.

28. The automatic pilot as set forth in claim 25 wherein the measuring means comprises a digital tachometer for producing pulses in response to steering motor rotation, means for counting said pulses, and means responsive to said counting means for producing a signal proportional to the number of pulses counted.

29. A method of steering a vessel having a helm comprising the steps of selecting a desired heading, measuring the amount of deviation of an actual heading from the selected heading, moving the helm in a corrective direction a distance proportional to the amount of deviation, measuring the amount of corrective helm movement, and disregarding said deviation while returning the helm in dependence upon the measured amount of corrective helm movement to its initial position less a small predetermined angle.

* * * * *